United States Patent
Yamakawa et al.

(10) Patent No.: US 7,459,212 B2
(45) Date of Patent: Dec. 2, 2008

(54) LAYERED THERMOPLASTIC-RESIN-ELASTOMER/RUBBER PRODUCT WITH IMPROVED WEATHERABILITY AND PNEUMATIC TIRE MADE WITH THE SAME

(75) Inventors: Kazuto Yamakawa, Hiratsuka (JP); Masahiro Ikawa, Hiratsuka (JP); Daisuke Kanenari, Hiratsuka (JP); Yuichi Hara, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 341 days.

(21) Appl. No.: 10/547,344

(22) PCT Filed: Dec. 24, 2004

(86) PCT No.: PCT/JP2004/019785

§ 371 (c)(1), (2), (4) Date: Sep. 1, 2005

(87) PCT Pub. No.: WO2005/063482

PCT Pub. Date: Jul. 14, 2005

(65) Prior Publication Data

US 2006/0182976 A1    Aug. 17, 2006

(30) Foreign Application Priority Data

Dec. 25, 2003    (JP)    ............................... 2003-430919

(51) Int. Cl.
| | | |
|---|---|---|
| *B32B 25/08* | (2006.01) |
| *B32B 25/14* | (2006.01) |
| *B32B 25/16* | (2006.01) |
| *B32B 25/18* | (2006.01) |
| *B32B 27/18* | (2006.01) |
| *B60C 5/00* | (2006.01) |

(52) U.S. Cl. .................. 428/421; 428/447; 428/473.5; 428/474.4; 428/480; 428/521; 428/522; 152/510

(58) Field of Classification Search ................ 156/510, 156/525, 537, 564; 428/421, 447, 473.5, 428/480, 474.4, 500, 521, 522, 532
See application file for complete search history.

(56) References Cited

U.S. PATENT DOCUMENTS 5,851,323 A * 12/1998 Kaido et al. ................ 152/510

FOREIGN PATENT DOCUMENTS

| EP | 1 228 902 A | 8/2002 |
| JP | 63-184502 A | 7/1988 |
| JP | 05-170935 A | 7/1993 |
| JP | 3217239 B2 | 8/2001 |
| JP | 2003-127146 A | 5/2003 |

OTHER PUBLICATIONS

PCT International Search Report for PCT/JP2004/019785 mailed on Apr. 26, 2005.

* cited by examiner

*Primary Examiner*—Ramsey Zacharia
(74) *Attorney, Agent, or Firm*—Connolly Bove Lodge & Hutz LLP

(57) ABSTRACT

A thermoplastic resin elastomer/rubber laminate comprising a rubber layer containing 100 parts by weight of a rubber and 0.1-20 parts by weight of an antioxidant preblended thereto and a thermoplastic resin elastomer composition layer, obtained by laminating at least two layers of the rubber layer and the thermoplastic resin elastomer composition layer followed by heating and pressing, whereby the antioxidant migrates from the rubber layer to the thermoplastic resin elastomer composition layer to improve the weathering resistance as well as a pneumatic tire using the same as an inner liner.

8 Claims, No Drawings

LAYERED THERMOPLASTIC-RESIN-ELASTOMER/RUBBER PRODUCT WITH IMPROVED WEATHERABILITY AND PNEUMATIC TIRE MADE WITH THE SAME

TECHNICAL FIELD

The present invention relates to a laminate of a thermoplastic resin elastomer composition layer and a rubber layer, more specifically, relates to a thermoplastic elastomer/rubber laminate having an improved weathering resistance useful as, for example, an inner liner of a pneumatic tire and also relates to a pneumatic tire using the same.

BACKGROUND ART

A thermoplastic elastomer/rubber layer having a layer using a composition of a thermoplastic resin and an elastomer (i.e., a thermoplastic elastomer composition layer) on the surface of a rubber layer is, for example, described in Japanese Patent No. 3217239, etc. and has characteristics such as flexibility, low temperature durability. However, an elastomer/rubber laminate having a thermoplastic elastomer/rubber composition on the surface thereof, when used in a state exposed to the outside, is subjected to UV light, heat, oxygen, ozone, etc. and the thermoplastic resin elastomer composition layer is aged, whereby cracks are formed and other problems in the weathering resistance occur. Therefore, when an antioxidant is compounded in advance to the composition so as to improve the aging resistance of the thermoplastic resin elastomer composition, while mixing the thermoplastic resin and elastomer, the antioxidant acts as an accelerator. Particularly, when using rubber as an elastomer, scorching of the rubber occurs, and therefore, there was the problem that a composition having the desired physical properties can not be obtained.

DISCLOSURE OF THE INVENTION

Accordingly, the objects of the present invention are to eliminate the above problems in the prior art and to provide a thermoplastic resin elastomer/rubber laminate having an improved weathering resistance.

In accordance with the present invention, there are provided a thermoplastic elastomer/rubber laminate comprising a rubber layer containing 100 parts by weight of a rubber and 0.1-20 parts by weight of an antioxidant preblended thereto and a thermoplastic resin elastomer composition layer, obtained by laminating at least two layers of the rubber layer and the thermoplastic resin elastomer composition layer, followed by press vulcanizing the laminate, whereby the antioxidant migrates from the rubber layer to the thermoplastic resin elastomer composition layer to improve the weathering resistance as well as a pneumatic tire using, as an inner liner, the same.

In accordance with the present invention, when producing a laminate of a thermoplastic resin elastomer composition layer and a rubber layer, an antioxidant, preferably an amine-based antioxidant, is compounded into the rubber layer in advance, a composition layer comprising a thermoplastic resin and an elastomer is laminated thereon, followed by, for example, press-vulcanizing the laminate, whereby the antioxidant migrates from the rubber layer to the thermoplastic resin elastomer composition layer, and therefore, the weathering resistance of the thermoplastic resin elastomer composition layer is improved. By, for example, press-vulcanizing the unvulcanized rubber containing the antioxidant compounded therein, in such a manner, the antioxidant migrates from the rubber layer to the thermoplastic resin elastomer composition layer and as a result, a laminate of the thermoplastic resin elastomer composition containing the migrated antioxidant and the vulcanized rubber is obtained. By arranging this laminate such that the thermoplastic elastomer composition layer contacts the outside air, it is possible to remarkably suppress the aging, the generation of cracks, etc. of the laminate due to the influence by ultraviolet light, heat, oxygen, ozone, etc.

BEST MODE FOR CARRING OUT THE INVENTION

The rubber layer of the laminate according to the present invention, includes any diene-based rubber capable of using for a tire such as, for example, natural rubbers (NR), polyisoprene rubbers (IR), various styrene-butadiene copolymer rubbers (SBR), various polybutadiene rubbers (BR), acrylonitrile-butadiene copolymer rubbers (NBR), chloroprene rubbers (CR), etc. These rubbers may be used alone or in any blends thereof. Further, a blend containing non-diene-based rubbers such as butyl rubbers (IIR), ethylene-propylene-diene terpolymer rubbers (EPDM), etc. may also be used in small amounts.

The thermoplastic resin elastomer layer of the laminate according to the present invention is comprised of a thermoplastic resin having an elastomer blended thereinto. As such a thermoplastic resin, polyamide-based resins (e.g., nylon 6 (N6), nylon 66 (N66), nylon 11 (N11), nylon 12 (N12), nylon 610 (N610), nylon 612 (N612), etc.), polyester-based resins (e.g., polybutylene terephthalate (PBT), polyethylene terephthalate (PET), polyethylene isophthalate (PEI), etc.), polynitrile-based resins (e.g., polyacrylonitrile (PAN), polymethacrylonitrile, etc.), polymethacrylate-based resins (e.g., polymethyl methacrylate (PMMA), polyethyl methacrylate, etc.), polyvinyl-based resins (e.g., vinyl acetate, polyvinyl alcohol (PVA), polyvinylidene chloride (PDVC), polyvinyl chloride (PVC), etc.), cellulose-based resins (e.g., cellulose acetate and cellulose acetate butyrate), fluorine-based resins (e.g., polyvinylidene fluoride (PVDF), polyvinyl fluoride (PVF), etc.), imide-based resins (e.g., an aromatic polyimide (PI)), etc. may be mentioned.

As the elastomer blended with the thermoplastic resin according to the present invention, for example, a diene-based rubbers and the hydrogenates thereof (e.g., NR, IR, SBR, BR, NBR, etc.), olefin-based rubbers (e.g., ethylene propylene rubbers (EPDM, EPM), IIR, etc.), acryl rubbers (ACM), halogen-containing rubbers (e.g., Br-IIR, Cl-IIR, bromides of isobutylene paramethyl styrene copolymers (Br-IPMS, etc.), silicone rubbers (e.g., methylvinyl silicone rubber, dimethyl silicone rubber, etc.), sulfur-containing rubbers (e.g., polysulfide rubber), fluorine rubbers (e.g., a vinylidene fluoride-based rubber, and fluorine-containing vinyl ether-based rubber), thermoplastic elastomers (e.g., a styrene-based elastomer, olefin-based elastomer, ester-based elastomer, urethane-based elastomer and polyamide-based elastomer), etc. may be mentioned. These may be used alone or in any mixtures thereof two types.

The above-mentioned elastomer components may also be dynamically vulcanized when mixing with the thermoplastic resin. Here, the "dynamic vulcanization" means the method of finely dispersing the elastomer component in the thermoplastic resin and simultaneously cross-linking and immobilizing the elastomer component. The types of a vulcanizing agent and a vulcanizing aid and vulcanization conditions (temperature and time), etc. in the case of dynamic vulcanization may be suitably determined depending upon the composition of the elastomer component added and is not particularly limited. As the vulcanization agent, a general rubber vulcanizing agent (or cross-linking agent) may be used. Specifically, as a sulfur-based vulcanizing agent, sulfur powder, precipitated sulfur, etc. may be used in an amount of, for example, about 0.5 to 4 phr (parts by weight based upon 100 parts by weight of the rubber component (polymer)).

Further, as the organic peroxide-based vulcanization agent, benzoylperoxide, t-butylhydroperoxide, 2,4-bichlorobenzoylperoxide, etc. may be mentioned and, as the thiourea-based vulcanization accelerator, ethylene thiourea, diethyl thiourea, etc. may be mentioned.

Further, as the vulcanizing aid, conventional rubber aids may be used together. For example, zinc white (approximately 5 phr (i.e., parts by weight based upon 100 parts by weight of the elastomer), stearic acid, oleic acid and their Zn salts (approximately 2 to 4 phr), etc. may be used. The production method of the thermoplastic elastomer composition comprises melt mixing, in advance, the thermoplastic resin component and the elastomer component (in the case of rubber, unvulcanized) by a twin-screw extruder etc. and dispersing the same in the thermoplastic resin to thereby form the continuous phase (or matrix phase), in which the elastomer component is dispersed, as the dispersed phase (or domain). When vulcanizing the elastomer component, it is also possible to add the vulcanization agent, while mixing, to dynamically vulcanize the elastomer component. Further, the various compounding agents for the thermoplastic resin or elastomer component (except for the vulcanization agent) may be added during the mixing, but preferably are premixed before the mixing. The mixing machine used for mixing the thermoplastic resin and elastomer components is not particularly limited, but a screw extruder, kneader, Banbury mixer, twin-screw extruder, etc. may be used. As the conditions for the melt mixing, the temperature may be any temperature or more where the thermoplastic resin melts. Further, the shear rate, when mixing, is preferably 1000 to 7500 sec$^{-1}$. The total mixing time is 30 seconds to 10 minutes. Further, when adding a vulcanization agent, the vulcanization time after adding is preferably 15 seconds to 5 minutes. The thermoplastic elastomer composition prepared by the above method is extrusion molding or calendar molding to a sheet-like film. The film formation method may be a conventional method of forming a film from a thermoplastic resin or thermoplastic elastomer.

The film thus obtained has a structure such that a matrix of a thermoplastic resin (A) into which an an elastomer component (B) is dispersed as a dispersed phase (i.e., domain). By adopting this state of a dispersed structure, thermoplastic processing becomes possible and the film can be provided with a sufficient flexibility. Further, it is possible to impart sufficient rigidity due to the effect of the resin layer as the continuous phase. Further, regardless of the amount of the elastomer component, at the time of molding, it is possible to obtain a moldability of the same extent as a thermoplastic resin, and therefore a film can be formed by a conventional resin molding machine, that is, by extrusion or calendar molding.

The specific ratio of the thermoplastic resin (A) and the elastomer component (B), when blending the thermoplastic resin and the elastomer, is not particularly limited and may be suitably determined by the balance of the film thickness, anti-air permeability and flexibility, but the preferable range is a weight ratio (A)/(B) of 10/90 to 90/10, more preferably 15/85 to 90/10.

As the antioxidant blended, in advance, into the rubber layer side, according to the present invention, for example, amine-based antioxidants such as naphthylamine-based antioxidants such as phenyl-2-naphthylamine, phenyl-l-naphthylamine, diphenylamine-based antioxidants such as 4,4'-α,α-dimethylbenzyl) diphenylamine, p-(P-toluenesulfonylamide)-diphenylamine, p-phenylenediamine-based antioxidants such as N,N'-diphenyl-p-phenylenediamine, N-isopropyl-N'-phenyl-p-phenylenediamine are preferably used, but their derivatives or mixtures may also be used.

According to the present invention, the amount of the antioxidant compounded into the rubber layer is 0.1 to 20 parts by weight, preferably 0.1 to 10 parts by weight, based upon 100 parts by weight of the rubber. If the compounded amount is too small, the desired weathering resistance cannot be obtained, whereas if too large, blooming unpreferably occurs.

The laminate of the thermoplastic resin elastomer composition layer and the rubber layer according to the present invention may be made by a general method as used in the past. For example, it may be made by coating, lamination, coextrusion, etc. Further, the method of bonding the thermoplastic resin elastomer composition layer and the rubber layer is not particularly limited, but, for example an adhesive, cement, direct bonding any other suitable method may be used.

The layer containing the thermoplastic resin elastomer composition and the rubber layer, in which 0.1 to 20 parts by weight based upon 100 parts by weight of rubber, of an antioxidant is preblended, do not necessarily have to be in direct contact. So long as the antioxidant is migrated to the thermoplastic resin elastomer composition by heating and pressing, it is possible to laminate the layers through a layer composed of another layer, which is sandwiched between the two layers.

The thermoplastic resin elastomer composition or the rubber composition according to the present invention may include, in addition to the essential components, any additives conventionally compounded into the thermoplastic elastomer compositions or the rubber compositions. For example, it is possible to compound therein carbon black, silica, or other fillers, a vulcanization or cross-linking agent, a vulcanization or cross-linking accelerator, various types of oil, an antioxidant, a plasticizer, or other various types of additives conventionally used for tire or other general rubber use. The additives may be used for mixing and vulcanizing by a conventional method to obtain a composition and used for vulcanization or cross-linking. The compounded amounts of these additives may be the conventional compounding amounts so long as the object of the present invention is not impaired.

EXAMPLES

Examples will now be used to further explain the present invention, but the scope of the present invention is by no means limited to these Examples.

Examples 1 to 11 and Comparative Example 1

Preparation of Sample of Sheet-Like Thermoplastic Resin Elastomer Composition 0.3 part by weight of ZnO, 1.2 parts by weight of zinc stearate and 0.6 part by weight of stearic acid were mixed to 100 parts by weight of a partially bromided polyisobutylene-p-methylstyrene copolymer (BIMS: Exxpro 89-4) by an internal Banbury mixer at an initial temperature of 40° C. for 5 minutes to prepare a rubber master batch. Thus, this rubber master batch was pelletized by a rubber pelletizer. 50 parts by weight of the rubber pellets thus obtained, 13 parts by weight of a nylon 6,66 copolymer (Toray Amylan CM6041) and 25 parts by weight of nylon 11 (Atofina Rilsan BMNO) were dynamically vulcanized by a twin-screw extruder at a temperature of 220° C. for 5 minutes, followed by pelletized. The pellets thus obtained were extruded by a T-die to form a 0.1 mm thick film.

Preparation of Rubber Sheet Sample

The ingredients other than the vulcanization accelerator and the sulfur in the formulation shown in Table I were mixed by a 1-liter internal mixer for 5 minutes and discharged when reaching 165±5° C. to obtain a master batch. The vulcanizing accelerator and the sulfur were mixed into the master batch by an open roll to obtain a sheet-like rubber composition.

Test Methods for Evaluation of Physical Properties

The sheet-like thermoplastic resin elastomer composition prepared above was brush coated with a rubber-based cement of the formulation shown in Table II, dried, laminated with a sheet-like rubber composition (i.e., 2 mm sheet) prepared above and then vulcanized at 190° C. for 10 minutes. The laminate of the thermoplastic resin elastomer composition and the rubber obtained (i.e., for carcass use) was punched to obtain a sample for a constant strain fatigue test by a JIS No. 2 Dumbbell.

Thereafter, a sample deterioration test was carried out as follows by an open frame carbon arc lamp.

The procedure according to the SA method of JIS K6266 was followed for a deterioration test on the laminate sample of the thermoplastic resin elastomer composition and the rubber laminate. The sample was set in such a manner that the thermoplastic resin elastomer composition side was faced to the light source. The test temperature was 63° C., the light was continuously irradiated and water was sprayed on the surface of the test piece at a cycle of 18 minutes every 102 minutes. The deterioration times were 48 hours, 96 hours, and 168 hours. Samples taken out at these times were evaluated for durability performance by the constant strain fatigue test explained below. The results are shown in Table I.

Constant Strain Fatigue Test Method

Each sample after the deterioration test was subjected to a constant strain fatigue test, in which 40% repeated elongation strain was applied at a 6.7 Hz cycle at 20° C. and evaluated for durability performance. The stage when the surface of the thermoplastic resin elastomer cracked was deemed the end of the evaluation. The evaluation was ended with 10 million repeated fatigue cycles.

TABLE I

| Name of material | Manufacturer and grade | Comp. Ex. 1 | 1 | 2 | 3 | 4 | 5 | 6 | 7 | 8 | 9 | 10 | 11 |
|---|---|---|---|---|---|---|---|---|---|---|---|---|---|
| Formulation (parts by weight) | | | | | | | | | | | | | |
| Natural rubber | RSS #3 | 80 | 80 | 80 | 80 | 80 | 80 | 80 | 80 | 80 | 80 | 80 | 80 |
| SBR 1502 | Nippon Zeon, Nipol 1502 | 20 | 20 | 20 | 20 | 20 | 20 | 20 | 20 | 20 | 20 | 20 | 20 |
| FEF carbon black | Chubu Carbon, HTC #100 | 50 | 50 | 50 | 50 | 50 | 50 | 50 | 50 | 50 | 50 | 50 | 50 |
| Stearic acid | NOF Corp., Beads Stearic Acid NY | 2 | 2 | 2 | 2 | 2 | 2 | 2 | 2 | 2 | 2 | 2 | 2 |
| Zinc oxide | Seido Chemical, Zinc White #3 | 3 | 3 | 3 | 3 | 3 | 3 | 3 | 3 | 3 | 3 | 3 | 3 |
| Sulfur | Karuizawa Refinery, sulfur powder | 3 | 3 | 3 | 3 | 3 | 3 | 3 | 3 | 3 | 3 | 3 | 3 |
| Vulcanizing accelerator NS | Ouchi Shinko Chemical Industrial, Noccelar NS-P | 1 | 1 | 1 | 1 | 1 | 1 | 1 | 1 | 1 | 1 | 1 | 1 |
| Aromatic oil | Showa Shell Oil, Desolex #3 | 2 | 2 | 2 | 2 | 2 | 2 | 2 | 2 | 2 | 2 | 2 | 2 |
| 2,2,4-trimethyl-1,2-dihydroquinoline polymer | Ouchi Shinko Chemical Industrial, Nocrac 224 | — | 2 | — | — | — | — | — | — | — | — | — | — |
| 6-ethoxy-1,2-dihydro-2,2,4-trimethylquinoline | Ouchi Shinko Chemical Industrial, Nocrac AW | — | — | 2 | — | — | — | — | — | — | — | — | — |
| Diphenylamine and acetone reaction product | Ouchi Shinko Chemical Industrial, Nocrac B | — | — | — | 2 | — | — | — | — | — | — | — | — |
| Phenyl-1-naphthylamine | Ouchi Shinko Chemical Industrial, Nocrac PA | — | — | — | — | 2 | — | — | — | — | — | — | — |
| Alkylated diphenylamine | Ouchi Shinko Chemical Industrial, Nocrac ODA | — | — | — | — | — | 2 | — | — | — | — | — | — |
| N,N'-di-naphthyl-p-phenylenediamine | Ouchi Shinko Chemical Industrial, Nocrac White | — | — | — | — | — | — | 2 | — | — | — | — | — |
| N-phenyl-N'-isopropyl-p-phenyldiamine | Ouchi Shinko Chemical Industrial, Nocrac 810MA | — | — | — | — | — | — | — | 2 | — | — | — | — |
| p-(p-toluenesulfonyl-amide)diphenylamine | Ouchi Shinko Chemical Industrial, Nocrac TD | — | — | — | — | — | — | — | — | 2 | — | — | — |
| Mixture of p-styrenated diphenylamine and p,p'-distyrenated diphenylamine | Seiko Chemical, Nonflex LAS | — | — | — | — | — | — | — | — | — | 2 | — | — |
| N-phenyl-N'-(1,3-dimethyl-butyl)-p-phenyldiamine | Ouchi Shinko Chemical Industrial, Nocrac 6C | — | — | — | — | — | — | — | — | — | — | 2 | — |
| N-phenyl-N'-(3-methacryloyloxy-2-hydroxypropyl)-p-phenyldiamine | Ouchi Shinko Chemical Industrial, Nocrac G-1 | — | — | — | — | — | — | — | — | — | — | — | 2 |

TABLE I-continued

| Name of material | Manufacturer and grade | Comp. Ex. 1 | Example 1 | 2 | 3 | 4 | 5 | 6 | 7 | 8 | 9 | 10 | 11 |
| --- | --- | --- | --- | --- | --- | --- | --- | --- | --- | --- | --- | --- | --- |
| Evaluated physical properties | | | | | | | | | | | | | |
| Open frame carbon arc lamp deterioration time and constant strain fatigue test | Deterioration time (48 hours) | 4.0 | 1000 | 1000 | 1000 | 1000 | 1000 | 1000 | 1000 | 1000 | 1000 | 1000 | 1000 |
| | Deterioration time (96 hours) | 0.1 | 480 | 800 | 720 | 510 | 520 | 315 | 1000 | 300 | 1000 | 1000 | 1000 |
| | Deterioration time (168 hours) | Eval. stopped | 255 | 635 | 440 | 350 | 310 | 110 | 1000 | 80 | 900 | 1000 | 950 |

TABLE II

Rubber-Based Cement

| Name of material | Manufacturer and grade | Compounded amount (parts by weight) |
| --- | --- | --- |
| Natural rubber | RSS #3 | 80 |
| SBR1502 | Nippon Zeon Nipol 1502 | 20 |
| FEF carbon black | Chubu Carbon HTC #100 | 50 |
| Stearic acid | NOF Corp. Beads Stearic Acid NY | 2 |
| Zinc oxide | Seido Chemical Zinc White #3 | 3 |
| Sulfur | Karuizawa Refinery sulfur powder | 3 |
| Vulcanizing accelerator NS | Ouchi Shinko Chemical Industrial Noccelar NS-P | 1 |
| Aromatic oil | Showa Shell Oil Desolex #3 | 2 |
| Hexamethoxymethylated melamine | Mitsui Cytec CYREZ-964RPC | 5 |
| Resorcinol-formaldehyde resin | Indspec Chemical Penacolite Resin B-18-S | 10 |
| Phenol formaldehyde resin | Hitachi Chemical Hitanol 1502Z | 1 |
| Toluene | Reagent grade toluene | 1000 |

INDUSTRIAL APPLICABILITY

As mentioned above, according to the present invention, by laminating composition a thermoplastic resin and elastomer having desired physical properties and an unvulcanized rubber composition, to which an antioxidant is preblended, it is possible for the antioxidant to migrate from the adjacent rubber layer to the thermoplastic resin elastomer layer, whereby the weathering resistance is improved, and therefore, this is extremely useful as, for example, the inner liner of a pneumatic tire.

The invention claimed is:

1. A thermoplastic elastomer/rubber laminate comprising at least one rubber layer containing 100 parts by weight of a rubber and 0.1-20 parts by weight of an antioxidant preblended thereto and at least one thermoplastic elastomer composition layer, obtained by laminating at least two layers of the at least one rubber layer and the at least one thermoplastic elastomer composition layer, followed by heating and pressing, whereby the antioxidant migrates from the rubber layer to the thermoplastic elastomer composition layer to improve the weathering resistance, said antioxidant being selected from the group consisting of N-phenyl-N'-(1,3-dimethyl-butyl)-p-phenylenediamine and N-phenyl N'-isopropyl-p-phenylenediamine and said thermoplastic elastomer composition comprising (A) at least one resin selected from the group consisting of polyamide-based resins, polyester-based resins, polynitrile-based resins, polymethacrylate resins, vinyl acetate-based resins, polyvinyl alcohol, polyvinylidene chloride, polyvinyl chloride, fluorine-based resins and imide-based resins and (B) at least one elastomer selected from the group consisting of diene-based rubbers and the hydrogenates thereof, acryl rubbers, halogen-containing rubbers, silicone rubbers, sulfur-containing rubbers, fluorine rubbers and thermoplastic elastomers.

2. A laminate as claimed in claim 1, wherein a ratio (A)/(B) (by weight ratio) of an thermoplastic resin (A) and an elastomer (B) in the thermoplastic elastomer composition is 10/90 to 90/10.

3. A laminate as claimed in claim 2, wherein the thermoplastic resin (A) is at least one polyamide-based resin.

4. A laminate as claimed in claim 2, wherein the elastomer (B) is at least one rubber selected from the group consisting of diene-based rubbers and their hydrogenates.

5. A laminate as claimed in claim 1, wherein the rubber forming the rubber layer is at least one rubber selected from the group consisting of natural rubbers, styrene-butadiene copolymer rubbers, polybutadiene rubbers, chloroprene rubbers, butyl rubbers and ethylene-propylene-diene terpolymer rubbers.

6. A pneumatic tire using, as an inner liner, a laminate according to claim 1.

7. A laminate as claimed in claim 1, wherein the amount of the antioxidant is 2-20 parts by weight, based upon 100 parts by weight of the rubber.

8. A laminate as claimed in claim 1, wherein the antioxidant is N-phenyl-N'-(1,3-dimethyl-butyl)-p-phenylenediamine.

* * * * *